US009701837B2

(12) United States Patent
Furukawa et al.

(10) Patent No.: US 9,701,837 B2
(45) Date of Patent: Jul. 11, 2017

(54) RESIN COMPOSITION FOR WIRE COVERING MATERIAL, INSULATED WIRE, AND WIRING HARNESS

(71) Applicants: AUTONETWORKS TECHNOLOGIES, LTD., Yokkaichi-shi, Mie (JP); SUMITOMO WIRING SYSTEMS, LTD., Yokkaichi-shi, Mie (JP); SUMITOMO ELECTRIC INDUSTRIES, LTD., Osaka-shi, Osaka (JP)

(72) Inventors: Toyoki Furukawa, Yokkaichi (JP); Satoshi Murao, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 0 days.

(21) Appl. No.: 14/895,427

(22) PCT Filed: May 29, 2014

(86) PCT No.: PCT/JP2014/064250
§ 371 (c)(1),
(2) Date: Dec. 2, 2015

(87) PCT Pub. No.: WO2014/203701
PCT Pub. Date: Dec. 24, 2014

(65) Prior Publication Data
US 2016/0130440 A1 May 12, 2016

(30) Foreign Application Priority Data

Jun. 19, 2013 (JP) ................................. 2013-128359

(51) Int. Cl.
*C08L 81/06* (2006.01)
*H01B 3/28* (2006.01)
*H01B 3/30* (2006.01)
*H01B 3/42* (2006.01)
*C08L 67/02* (2006.01)

(52) U.S. Cl.
CPC ............ *C08L 81/06* (2013.01); *C08L 67/025* (2013.01); *H01B 3/28* (2013.01); *H01B 3/301* (2013.01); *H01B 3/421* (2013.01); *H01B 3/423* (2013.01); *C08L 2205/03* (2013.01)

(58) Field of Classification Search
CPC .... C08L 81/06; C08L 67/025; C08L 2205/03; H01B 3/301; H01B 3/28; H01B 3/421; H01B 3/423
See application file for complete search history.

(56) References Cited

U.S. PATENT DOCUMENTS

| 6,066,806 | A | * | 5/2000 | Higashiura | ............ | H01B 3/301 |
|---|---|---|---|---|---|---|
| | | | | | | 174/11 OFC |
| 2001/0010269 | A1 | * | 8/2001 | Higashiura | ........... | H01F 27/323 |
| | | | | | | 174/120 R |
| 2008/0167406 | A1 | * | 7/2008 | Yamada | .................. | C08L 67/02 |
| | | | | | | 524/116 |
| 2009/0203871 | A1 | | 8/2009 | Maruyama et al. | | |
| 2012/0261185 | A1 | * | 10/2012 | Murao | ................ | B60R 16/0207 |
| | | | | | | 174/72 A |
| 2013/0233588 | A1 | | 9/2013 | Furukawa et al. | | |

FOREIGN PATENT DOCUMENTS

| CN | 101341186 A | 1/2009 | | |
|---|---|---|---|---|
| EP | 0463738 A2 | 1/1992 | | |
| JP | H02-16158 A | 1/1990 | | |
| JP | H02-183907 A | 7/1990 | | |
| JP | H02-273411 A | 11/1990 | | |
| JP | H04-39355 A | 2/1992 | | |
| JP | H05-182543 A | 7/1993 | | |
| JP | H07-173394 A | 7/1995 | | |
| JP | H07-331043 A | 12/1995 | | |
| JP | H08-241628 A | 9/1996 | | |
| JP | H11-66960 A | 3/1999 | | |
| JP | 2013-120664 A | 6/2013 | | |
| WO | WO 2011078234 A1 | * | 6/2011 | ......... B60R 16/0207 |
| WO | 2012/090921 A1 | 7/2012 | | |
| WO | 2013/168525 A1 | 11/2013 | | |

OTHER PUBLICATIONS

Schechter, L., et al.; Industrial and Engineering Chemistry, 1956, p. 86-93.*
Scheirs, J., et al.; Modern Polyesters: Chemistry and Technology of Polyesters and Copolyesters, 2003, p. 293-321.*
Jul. 29, 2014 International Search Report issued in International Patent Application No. PCT/JP2014/064250.
Aug. 22, 2016 Office Action issued in Chinese Patent Application No. 201480032720.4.
Mar. 17, 2017 Office Action issued in Chinese Patent Application No. 201480032720.4.

* cited by examiner

*Primary Examiner* — Robert Jones, Jr.
(74) *Attorney, Agent, or Firm* — Oliff PLC

(57) ABSTRACT

A resin composition for a wire covering material that is excellent in high-temperature oil resistance, wear resistance, and elongation, and an insulated wire and a wiring harness in which the resin composition for a wire covering material is used as the covering material contains a (A) polysulfone-based resin, a (B) aromatic polyester resin, a (C) polyester elastomer, and a (D) compound having a reactive functional group that reacts with one of a carboxyl group and a hydroxyl group, wherein the (D) component reacts with the (B) component or the (C) component to form a bond.

11 Claims, 1 Drawing Sheet

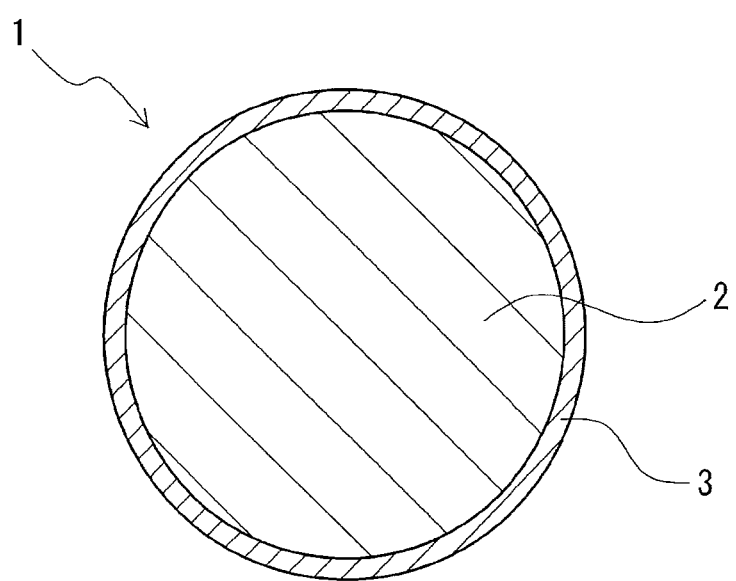

RESIN COMPOSITION FOR WIRE COVERING MATERIAL, INSULATED WIRE, AND WIRING HARNESS

TECHNICAL FIELD

The present invention relates to resin compositions for a wire covering material, insulated wires, and wiring harnesses, and more specifically relates to resin compositions for a wire covering material that are excellent in high-temperature oil resistance, wear resistance, elongation, and are suitably used for covering materials for automotive electric wires, and insulated wires and wiring harnesses in which the resin compositions for a wire covering material are used as the covering materials.

BACKGROUND ART

Insulated wires covered with a fluororubber or a fluororesin that is excellent in heat resistance and oil resistance are known as insulated wires that can be used in oil at high temperature (PTL 1 to PTL 3).

In addition, insulated wires covered with polysulfone or polyether sulfone that is excellent in wear resistance are known as insulated wires that can be used in a vibration environment such as the interior of an automobile (PTL 4 to PTL 5).

CITATION LIST

Patent Literature

PTL1: JP11-66960A
PTL2: JP05-182543A
PTL3: JP08-241628A
PTL4: JP02-273411A
PTL5: JP02-183907A

SUMMARY OF INVENTION

Technical Problem

The insulated wires covered with a fluororubber or a fluororesin are inferior in wear resistance, and thus are not suited for use in a vibration environment such as the interior of an automobile. In particular, the insulated wires covered with a fluororubber or a fluororesin do not suit the purpose of reducing the thickness of the insulation covering to achieve space-saving.

The insulated wires covered with polysulfone or polyether sulfone are inferior in elongation, and thus not suited for use in a site where a bending force is exerted on the insulated wires at the time of wiring in an automobile.

The present invention has been made in view of the above circumstances and has an object to overcome the above problems, and to provide a resin composition for a wire covering material that is excellent in high-temperature oil resistance, wear resistance, and elongation, and an insulated wire and a wiring harness in which the resin composition for a wire covering material is used as the covering material.

Solution to Problem

In order to solve the problems described above, the resin composition for a wire covering material according to the present invention contains a (A) polysulfone-based resin, a (B) aromatic polyester resin, a (C) polyester elastomer, and a (D) compound having a reactive functional group that reacts with a carboxyl group or a hydroxyl group, wherein the (D) component reacts with the (B) component or the (C) component to form a bond.

It is preferable that 1 to 50 mass % of the (C) polyester elastomer should be contained in the total of the (A) component to the (C) component. It is preferable that 1 to 40 mass % of the (B) aromatic polyester resin should be contained in the total of the (A) component to the (B) component. It is preferable that 0.01 to 5 parts by mass of the (D) compound having a reactive functional group that reacts with a carboxyl group or a hydroxyl group should be contained with respect to 100 parts by mass of the total of the (A) component to the (C) component.

It is preferable that the polysulfone-based resin should be one or two or more kinds of polysulfone-based resins selected from the group consisting of polyether sulfone and polyphenyl sulfone. It is preferable that the (B) aromatic polyester resin should have a naphthyl group in a repeating unit structure. It is preferable that the (C) polyester elastomer should have a melting point of 200° C. or higher.

The insulated wire according to the present invention includes a wire covering that is made from the above-described resin composition for a wire covering material.

The wiring harness according to the present invention includes the above-described insulated wire.

Advantageous Effects of Invention

Containing the (A) polysulfone-based resin, the (B) aromatic polyester resin, the (C) polyester elastomer, and the (D) compound having a reactive functional group that reacts with a carboxyl group or a hydroxyl group, wherein the (D) component reacts with one of the (B) component and the (C) component to form a bond, the resin composition for a wire covering material according to the present invention can be made excellent in high-temperature oil resistance, wear resistance, and elongation.

When the polyether sulfone, the polyphenyl sulfone, or a combination of the polyether sulfone and the polyphenyl sulfone is used as the polysulfone-based resin, the resin composition for a wire covering material according to the present invention is more excellent in wear resistance. When the aromatic polyester resin having a naphthyl group in its repeating unit structure is used as the aromatic polyester resin, the resin composition for a wire covering material according to the present invention has more excellent compatibility between the polysulfone-based resin and the polyester elastomer and more excellent high-temperature oil resistance. When the polyester elastomer having the melting point of 200° C. or higher is used as the polyester elastomer, the resin composition for a wire covering material according to the present invention is more excellent in high-temperature oil resistance.

BRIEF DESCRIPTION OF DRAWINGS

FIG. 1 is a cross-sectional view of an insulated wire according to one embodiment of the present invention.

MODE FOR CARRYING OUT THE INVENTION

The resin composition for a wire covering material according to the present invention contains a (A) polysulfone-based resin, a (B) aromatic polyester resin, a (C)

polyester elastomer, and a (D) compound having a reactive functional group that reacts with a carboxyl group or a hydroxyl group.

The (A) polysulfone-based resin is a thermoplastic resin, and has a sulfonyl group in its repeating unit structure (in its main chain). The (A) polysulfone-based resin is a component for improving the high-temperature oil resistance and the wear resistance of the resin composition for a wire covering material according to the present invention. Specific examples of the (A) polysulfone-based resin include polysulfone, polyether sulfone, and polyphenyl sulfone. A single kind of the polysulfone-based resin may be used alone, or two or more kinds of the polysulfone-based resins may be used in combination. From the viewpoint of having a more excellent effect of improving the high-temperature oil resistance and the wear resistance, it is preferable that the (A) polysulfone-based resin should be the polyether sulfone, the polyphenyl sulfone, or a combination of the polyether sulfone and the polyphenyl sulfone. In addition, from the viewpoint of having especially excellent effect of improving the high-temperature oil resistance, the polyphenyl sulfone is preferred.

The (C) polyester elastomer is a component for improving the elongation (insulation elongation) of the resin composition for a wire covering material according to the present invention. However, the (C) polyester elastomer itself has low compatibility with the (A) polysulfone-based resin, so that even if the (C) polyester elastomer alone is mixed with the (A) polysulfone-based resin, the elongation is not improved, and the physical properties such as the high-temperature oil resistance and the wear resistance that are improved by using the (A) polysulfone-based resin are deteriorated. For this reason, the (C) polyester elastomer is added together with the (B) aromatic polyester resin. By adding the (C) polyester elastomer together with the (B) aromatic polyester resin, the compatibility between the (C) polyester elastomer and the (A) polysulfone-based resin is improved, and the effect of improving the elongation by the addition of the (C) polyester elastomer can be achieved. In addition, the physical properties such as the high-temperature oil resistance and the wear resistance that are improved by using the (A) polysulfone-based resin can be prevented from being deteriorated.

The (C) polyester elastomer consists of block copolymers of a hard segment and a soft segment. Examples of the hard segment include an aromatic polyester and an aliphatic polyester such as PBT and PBN. Examples of the soft segment include an aliphatic polyether and an aliphatic polyester. The (C) polyester elastomer having a melting point of 200° C. or higher is preferred from the viewpoint of having excellent high-temperature oil resistance, and the (C) polyester elastomer having a melting point of 210° C. or higher is more preferred.

The (B) aromatic polyester resin is a thermoplastic resin, and is capable of improving the compatibility between the (A) polysulfone-based resin and the (C) polyester elastomer. In addition, the (B) aromatic polyester resin has an aromatic ring in its repeating unit structure (in its molecule), and thus is capable of improving the high-temperature oil resistance. Examples of the (B) aromatic polyester resin include polyethylene terephthalate (PET), polybutylene terephthalate (PBT), polyethylenenaphthalate (PEN), and polybutylene naphthalate (PBN). As the (B) aromatic polyester resin, a single kind of the aromatic polyester resin may be used alone, or two or more kinds of the aromatic polyester resins may be used in combination. From the viewpoint of achieving especially excellent compatibility between the (A) polysulfone-based resin and the (C) polyester elastomer and excellent high-temperature oil resistance, PEN, PBN, or a combination of PEN and PBN having a naphthyl group in its repeating unit structure is preferred as the (B) aromatic polyester resin.

The resin composition for a wire covering material according to the present invention contains the above-described (A) to (C) components, and a wire covering of an insulated wire is made from the resin composition. The forming temperature of the composition is increased because of the (A) polysulfone-based resin, so that the physical properties (the high-temperature oil resistance, the wear resistance, and the like) are deteriorated because of the decrease in molecular weight of the (B) aromatic polyester resin and the (C) polyester elastomer, especially in molecular weight of the (C) component. The (D) compound having a reactive functional group that reacts with a carboxyl group or a hydroxyl group reacts with the (B) component or the (C) component to form a bond (having an effect of chain extension), and thereby the decrease in molecular weight can be minimized, which can prevent the deterioration of the physical properties. In addition, the (B) component or the (C) component to which the (D) component is bonded has its melt viscosity increased, which improves the compatibility with the (A) polysulfone-based resin. The effect of improving the physical properties can be produced also by this improvement.

A component having a high decomposition temperature is preferred as the (D) component from the viewpoint of preventing the decrease in molecular weight of the (B) component or the (C) component. A component having a relatively large molecular weight is preferred as the (D) component having a high decomposition temperature. Examples of such a compound include a polymer having a reactive functional group that reacts with a carboxyl group or a hydroxyl group.

Examples of the reactive functional group that reacts with a carboxyl group or a hydroxyl group in the (D) component include an epoxy group, a carbodiimide group, and an oxazoline group. Examples of the polymer having the reactive functional group that reacts with a carboxyl group or a hydroxyl group include a polycarbodiimide, a maleic acid-modified polymer, a glycidyl-modified polymer, and an oxazoline-modified polymer.

Even if the (D) compound having a reactive functional group that reacts with a carboxyl group or a hydroxyl group is a monofunctional compound having one reactive functional group in its molecule, the (D) compound sufficiently achieves the above-described effect; however, when the (D) compound is a compound having two or more functional groups, the (D) compound can form a bond with the (B) component and a bond with the (C) component to achieve an effect of more improving the compatibility between the (B) component and the (C) component.

1 to 50 mass % of the (C) polyester elastomer is preferably contained, and 5 to 30 mass % of the (C) polyester elastomer is more preferably contained in the total of the (A) component to the (C) component. When the content of the (C) polyester elastomer is 1 mass % or more in the total components, the effect of improving the elongation is enhanced. When the content of the (C) polyester elastomer is 50 mass % or less in the total components, excellent high-temperature oil resistance and excellent wear resistance can be easily obtained.

1 to 40 mass % of the (B) aromatic polyester resin is preferably contained, and 5 to 30 mass % of the (B) aromatic polyester resin is more preferably contained in the total of the (A) component to the (B) component. When the content of the (B) aromatic polyester resin is 1 mass % or more in the total components, the compatibility of the (C) polyester elastomer with the (A) polysulfone-based resin can be easily improved, and thereby the effect of improving the elongation is enhanced. In addition, excellent wear resistance can be easily obtained. When the content of the (B) aromatic polyester resin is 40 mass % or less in the total components, the decrease in wear resistance can be easily prevented, and thereby excellent wear resistance can be easily obtained. In addition, the effect of improving the elongation is enhanced.

0.01 to 5 parts by mass of the (D) compound having a reactive functional group that reacts with a carboxyl group or a hydroxyl group is preferably contained, and 0.1 to 1 part by mass of the (D) compound is more preferably contained with respect to 100 parts by mass of the total of the (A) component to the (C) component. When the content of the (D) component is 0.01 parts by mass or more with respect to 100 parts by mass of the total components, the (D) compound reacts to form a bond with the (B) component or the (C) component, and thereby the effect of minimizing the decrease in molecular weight can be enhanced. Thus, the effects of improving the high-temperature oil resistance, the wear resistance, and the elongation are enhanced. In addition, when the content of the (D) component is 5 parts by mass or less with respect to 100 parts by mass of the total components, the influence on the physical properties due to insufficient kneading can be minimized, and thereby the excellent high-temperature oil resistance, wear resistance, and elongation can be maintained.

Other than the (A) to (D) components, additives generally used for a wire covering material can be added to the resin composition for a wire covering material as necessary. Examples of the additives include a filler, a pigment, an antioxidant, and an anti-aging agent.

Because the (D) compound reacts to form a bond with the (B) component or the (C) component, the resin composition for a wire covering material can be excellent in high-temperature oil resistance, wear resistance, and elongation. The elongation of the resin composition for a wire covering material is preferably 180% or more, and more preferably 200% or more. The elongation defines an elongation at break.

Next, a description of an insulated wire in which a wire covering is made from the resin composition for a wire covering material according to the present invention will be provided. FIG. 1 shows a configuration of the insulated wire according to one embodiment of the present invention. As shown in FIG. 1, an insulated wire 1 includes a metal conductor 2 and an insulating covering layer 3 that is disposed on the outer circumference of the metal conductor 2. The insulating covering layer 3 is a single layer while not specifically limited. The resin composition for a wire covering material according to the present invention is used as the material for the insulating covering layer 3. By using the resin composition for a wire covering material according to the present invention as the covering material, excellent high-temperature oil resistance and wear resistance can be maintained while the elongation can be improved.

While copper is generally used for the metal conductor 2, aluminum, magnesium, or the like other than copper can be used for the conductor. In addition, other metals may be contained in addition to copper. Examples of the other metals include iron, nickel, magnesium, and silicon. In addition to these metals, a metal that is widely used in general as a conductor may be added to the copper or may be used alone in the metal conductor 2. In addition, a single wire may be used, or a stranded wire of a plurality of wires may be used for the metal conductor 2. At this time, stranding to compress the stranded wire allows reduction in diameter.

The cross-sectional area of the metal conductor 2, the thickness of the insulating covering layer 3, and the like can be selected appropriately depending on the use of the insulated wire 1, and are not specifically limited. Being excellent in high-temperature oil resistance and wear resistance, the insulated wire 1 can be used as an insulated wire for use in a vibration environment or in oil at high temperature such as the interior of an automobile (e.g., an automotive insulated wire), or the like.

The insulated wire 1 can be obtained by kneading a material for the insulating covering layer 3 with the use of a generally used kneader such as an extruder (a single-screw extruder, a twin-screw extruder), a Banbury mixer, a pressure kneader, and a roll to extrusion-cover the outer circumference of the metal conductor 2 with the insulating covering layer 3 with the use of a generally used extrusion molding machine.

A connecting terminal and a connector are connected to the insulated wire 1 at the terminals, and thus a wiring harness is produced. In addition, a plurality of insulated wires 1 are tied in a bundle, and thus a wiring harness is produced.

EXAMPLES

Hereinafter, a description of the present invention will be provided with reference to the examples.

Examples 1 to 24, Comparative Examples 1 to 8, and Reference Example

[Preparation of Electric Wires]

In accordance with the component compositions (parts by mass) of the resin compositions shown in Examples 1 to 8 in Table 1, Examples 9 to 16 in Table 2, Examples 17 to 24 in Table 3, Comparative Examples 1 to 8 in Table 4, and the reference example, the resin compositions for insulating covering layers were kneaded with the use of a twin-screw kneader such that the resin temperatures in the vicinities of the dies became the optimum molding temperature. The kneaded resin compositions were extrusion-molded around the stranded conductors having a cross-sectional area of 0.35 mm$^2$ so as to become insulating covering layers having a thickness of covering of 0.2 mm, and thus the insulated wires according to Examples 1 to 24 and Comparative examples 1 to 8 were obtained. Dices having a diameter of 1.1 mm and nipples having a diameter of 0.75 mm were used in the extrusion molding. In addition, the extrusion molding was performed at the linear velocity of 50 m/min. at extrusion temperatures such that the resin temperatures in the vicinities of the dies became the optimum molding temperature. Evaluations of high-temperature oil resistance, insulation elongation, and wear resistance were performed on the obtained insulated wires. The test results are shown in Tables 1 to 4. It is to be noted that the specific used materials of the components, the method for determining the optimum molding temperature, and the test method are as follows.

[Used Materials]

<(A) Polysulfone-Based Resin>

Polysulfone (PSU): Udel P-1700NT (manufactured by SOLVAY ADVANCED POLYMERS, LLC)

Polyether sulfone (PES): SUMIKAEXCEL 4100G (manufactured by SUMITOMO CHEMICAL CO., LTD.)

Polyphenyl sulfone (PPSU): ULTRASON P3010 (manufactured by BASF JAPAN LTD.)

<(B) Aromatic Polyester Resin>

Polybutylene terephthalate (PBT): DURANEX 800FP (manufactured by POLYPLASTICS CO., LTD.)

Polybutylene naphthalate (PBN): TQB-OT (manufactured by TEIJIN CHEMICALS LTD.)

Polyethylene naphthalate (PEN): TEONEX TN-8065S (manufactured by TEIJIN CHEMICALS LTD.)

<(C) Polyester Elastomer>

(C) Polyester elastomer <1>: HYTREL 4047 (manufactured by DU PONT-TORAY CO., LTD., having a melting point of 182° C.)

(C) Polyester elastomer <2>: HYTREL 5557 (manufactured by DU PONT-TORAY CO., LTD., having a melting point of 208° C.)

(C) Polyester elastomer <3>: HYTREL 7277 (manufactured by DU PONT-TORAY CO., LTD., having a melting point of 219° C.)

(C) Polyester elastomer <4>: PELPRENE EN-2034 (manufactured by TOYOBO CO., LTD., having a melting point of 224° C.)

<(D) Compound Having a Reactive Functional Group that Reacts with a Carboxyl Group or a Hydroxyl Group>

Carbodiimide group-containing compound: CARBODI-LITE LA-1 (manufactured by NISSHINBO HOLDINGS INC.) (polycarbodiimide, a compound having two or more functional groups)

Epoxy group-containing compound: JONCRYLADR4300S (manufactured by BASF JAPAN LTD.) (a polymer having an epoxy group, a compound having two or more functional groups)

[Method for Determining the Optimum Molding Temperature]

In determining the optimum molding temperature, MI measurement at each temperature (in accordance with JISK7210) was conducted, and the temperature at which MI becomes 1.0 g/10 min. (the load: 2.16 kg) was determined to be the optimum molding temperature. When MI far exceeds 1.0 g/10 min., there is a high possibility of causing a drawdown, and the composition is not suitable for a wire covering material. When MI falls far short of 1.0 g/10 min., the composition is low in fluidity, and cannot be extruded.

[High-Temperature Oil Resistance]

After the insulated wires were immersed in ATF (a genuine product by NISSAN ATF: NS-2) at 120° C. for any hours, self-diameter winding tests were performed thereon, and then withstand voltage tests of 1 kv×1 min. were performed thereon. The insulated wires in which insulation breakdown did not occur even when the immersion times are 3000 hours or more and could bear the withstand voltage tests were rated as passed, "Good". The insulated wires in which insulation breakdown did not occur even when the immersion times are 4000 hours or more and could bear the withstand voltage tests were rated as passed, "Very good". The insulated wires in which insulation breakdown occurred when the immersion times are less than 3000 hours and could not bear the withstand voltage tests were rated as failed, "Poor".

[Insulation Elongation]

The insulating covering layers having a predetermined length were taken out by taking the conductors out of the insulated wires, and thus test specimens were prepared. Tensile tests were performed on the insulating covering layers with the use of s tensile strength tester on the conditions that a distance between reference lines is 20 mm and a tension rate is 50 mm/min. The insulating covering layers of which the insulation elongations were 180% or more were rated "Good" (passed). The insulating covering layers of which the insulation elongations were 200% or more were rated "Very good" (passed). The insulating covering layers of which the insulation elongations were less than 180% were rated "Poor" (failed).

[Wear Resistance]

Wear resistance tests were performed in accordance with the ISO 6722 by a blade-reciprocating method. The load imposed on the blade was set to be 7N, and the insulated wires of which the smallest values among the four times of tests were 700 times or more were rated as passed (Good). The insulated wires of which the smallest values among the four times of tests were 1000 times or more were rated as passed (Very good). The insulated wires of which the smallest values of the four times of tests were less than 700 times were rated as failed (Poor).

TABLE 1

| | | Examples | | | | | | | |
|---|---|---|---|---|---|---|---|---|---|
| | | 1 | 2 | 3 | 4 | 5 | 6 | 7 | 8 |
| Component A | Polysulfone | | | 75 | | | | | |
| | Polyether sulfone | | 75 | | | | | | |
| | Polyphenyl sulfone | 75 | | | 75 | 75 | 75 | 75 | 75 |
| Component B | Polybutylene terephthalate | | | | | | 10 | | |
| | Polybutylene naphthalate | | | | 10 | | | | |
| | Polyethylene naphthalate | 10 | 10 | 10 | | | 10 | 10 | 10 |
| Component C | Polyester elastomer <1> | | | | | | 15 | | |
| | Polyester elastomer <2> | | | | | | | 15 | |
| | Polyester elastomer <3> | 15 | 15 | 15 | 15 | 15 | | | |
| | Polyester elastomer <4> | | | | | | | | 15 |
| Component D | Carbodiimide group-containing compound | | | | | | | | |
| | Epoxy group-containing compound | 0.1 | 0.1 | 0.1 | 0.1 | 0.1 | 0.1 | 0.1 | 0.1 |
| | Optimum molding temperature (° C.) | 320 | 320 | 320 | 320 | 320 | 300 | 310 | 330 |
| | High-temperature oil resistance | Very good | Good | Good | Very good | Good | Good | Very good | Very good |
| | Insulation elongation | Very good | Very good | Very good | Very good | Good | Very good | Very good | Very good |
| | Wear resistance | Very good | Very good | Good | Very good | Good | Very good | Very good | Very good |

TABLE 2

|  |  | Examples |  |  |  |  |  |  |  |
|---|---|---|---|---|---|---|---|---|---|
|  |  | 9 | 10 | 11 | 12 | 13 | 14 | 15 | 16 |
| Component A | Polysulfone |  |  |  |  |  |  |  |  |
|  | Polyether sulfone |  |  |  |  |  |  |  |  |
|  | Polyphenyl sulfone | 75 | 30 | 49.5 | 59.5 | 98 | 75 | 75 | 35 |
| Component B | Polybutylene terephthalate |  |  |  |  |  |  |  |  |
|  | Polybutylene naphthalate |  |  |  |  |  |  |  |  |
|  | Polyethylene naphthalate | 10 | 20 | 0.5 | 39.5 | 1 | 10 | 10 | 5 |
| Component C | Polyester elastomer <1> |  |  |  |  |  |  |  |  |
|  | Polyester elastomer <2> |  |  |  |  |  |  |  |  |
|  | Polyester elastomer <3> | 15 | 50 | 50 | 1 | 1 | 15 | 15 | 60 |
|  | Polyester elastomer <4> |  |  |  |  |  |  |  |  |
| Component D | Carbodiimide group-containing compound | 0.1 |  |  |  |  |  |  |  |
|  | Epoxy group-containing compound |  | 0.1 | 0.1 | 0.1 | 0.1 | 0.01 | 3 | 0.1 |
| Evaluation | Optimum molding temperature (° C.) | 320 | 300 | 310 | 330 | 350 | 320 | 320 | 300 |
|  | High-temperature oil resistance | Very good | Very good | Very good | Very good | Very good | Very good | Very good | Very good |
|  | Insulation elongation | Very good | Very good | Very good | Very good | Very good | Very good | Very good | Very good |
|  | Wear resistance | Very good | Very good | Very good | Very good | Very good | Very good | Very good | Good |

TABLE 3

|  |  | Examples |  |  |  |  |  |  |  |
|---|---|---|---|---|---|---|---|---|---|
|  |  | 17 | 18 | 19 | 20 | 21 | 22 | 23 | 24 |
| Component A | Polysulfone |  |  |  |  |  | 25 |  |  |
|  | Polyether sulfone |  |  |  |  |  |  |  |  |
|  | Polyphenyl sulfone | 90 | 45 | 84.5 | 75 | 75 | 50 | 75 | 75 |
| Component B | Polybutylene terephthalate |  |  |  |  |  |  |  |  |
|  | Polybutylene naphthalate |  |  |  |  |  |  |  |  |
|  | Polyethylene naphthalate | 9.5 | 40 | 0.5 | 10 | 10 | 10 | 5 | 10 |
| Component C | Polyester elastomer <1> |  |  |  |  |  |  |  | 5 |
|  | Polyester elastomer <2> |  |  |  |  |  |  |  |  |
|  | Polyester elastomer <3> | 0.5 | 15 | 15 | 15 | 15 | 15 | 15 | 10 |
|  | Polyester elastomer <4> |  |  |  |  |  |  |  |  |
| Component D | Carbodiimide group-containing compound |  |  |  |  |  |  |  |  |
|  | Epoxy group-containing compound | 0.1 | 0.1 | 0.1 | 0.001 | 10 | 0.1 | 0.1 | 0.1 |
| Evaluation | Optimum molding temperature (° C.) | 330 | 320 | 320 | 320 | 320 | 320 | 320 | 320 |
|  | High-temperature oil resistance | Good | Very good | Good | Good | Good | Good | Good | Good |
|  | Insulation elongation | Good | Good | Good | Good | Good | Very good | Good | Very good |
|  | Wear resistance | Good | Good | Good | Good | Good | Good | Good | Very good |

TABLE 4

|  |  | Comparative examples |  |  |  |  |  |  |  | Reference example |
|---|---|---|---|---|---|---|---|---|---|---|
|  |  | 1 | 2 | 3 | 4 | 5 | 6 | 7 | 8 |  |
| Component A | Polysulfone |  |  |  |  |  |  |  |  |  |
|  | Polyether sulfone |  |  |  |  |  |  |  |  |  |
|  | Polyphenyl sulfone | 100 |  | 100 |  |  | 80 | 80 |  | 75 |
| Component B | Polybutylene terephthalate |  |  |  |  |  |  |  |  |  |
|  | Polybutylene naphthalate |  |  |  |  |  |  |  |  |  |
|  | Polyethylene naphthalate |  |  |  | 100 |  | 20 |  | 50 | 10 |
| Component C | Polyester elastomer <1> |  | 100 |  |  |  |  |  |  |  |
|  | Polyester elastomer <2> |  |  |  |  |  |  |  |  |  |
|  | Polyester elastomer <3> |  |  |  |  | 100 |  | 20 | 50 | 15 |
|  | Polyester elastomer <4> |  |  |  |  |  |  |  |  |  |
| Component D | Carbodiimide group-containing compound |  |  |  |  |  |  |  |  |  |
|  | Epoxy group-containing compound |  |  | 0.1 | 0.1 | 0.1 | 0.1 | 0.1 | 0.1 |  |

TABLE 4-continued

|  |  | Comparative examples | | | | | | | | Reference example |
|---|---|---|---|---|---|---|---|---|---|---|
|  |  | 1 | 2 | 3 | 4 | 5 | 6 | 7 | 8 |  |
| Evaluation | Optimum molding temperature (° C.) | 380 | 290 | 380 | 290 | 240 | 350 | 350 | 290 | 320 |
|  | High-temperature oil resistance | Very good | Poor | Very good | Very good | Poor | Very good | Poor | Very good | Poor |
|  | Insulation elongation | Poor | Very good | Poor | Poor | Very good | Poor | Poor | Very good | Poor |
|  | Wear resistance | Very good | Poor | Very good | Poor | Poor | Very good | Poor | Poor | Good |

As shown in Table 4, the resin composition for a wire covering material according to Comparative example 1 is made only from the (A) polysulfone-based resin, so that the molding temperature is high, and the elongation (insulation elongation) is low. The resin composition for a wire covering material according to Comparative example 2 is made only from the (C) polyester elastomer, so that while being excellent in insulation elongation, the resin composition is inferior in high-temperature oil resistance and wear resistance. The resin composition for a wire covering material according to Comparative example 3 contains only the (A) polysulfone-based resin and the (D) compound having a reactive functional group that reacts with a carboxyl group or a hydroxyl group, so that there is no improvement in elongation (insulation elongation). The resin composition for a wire covering material according to Comparative example 4 contains only the (B) aromatic polyester resin and the (D) component, so that there is no improvement in elongation (insulation elongation), and the resin composition is also inferior in wear resistance. The resin composition for a wire covering material according to Comparative example 5 contains only the (C) polyester elastomer and the (D) component, so that the resin composition is inferior in high-temperature oil resistance and wear resistance as is Comparative example 2.

The resin composition for a wire covering material according to Comparative example 6 contains only the (A) polysulfone-based resin, the (B) aromatic polyester resin, and the (D) component, and does not contain the (C) polyester elastomer, so that there is no improvement in elongation (insulation elongation). The resin composition for a wire covering material according to Comparative example 7 contains only the (A) polysulfone-based resin, the (C) polyester elastomer, and the (D) component, and does not contain the (B) aromatic polyester resin, so that compatibility between the (A) polysulfone-based resin and the (C) polyester elastomer is bad, and the physical properties are deteriorated. The resin composition for a wire covering material according to Comparative example 8 contains only the (B) aromatic polyester resin, the (C) polyester elastomer, and the (D) component, and does not contain the (A) polysulfone-based resin, so that the resin composition is inferior in wear resistance while having its molding temperature lowered and being excellent in high-temperature oil resistance and insulation elongation.

The resin composition for a wire covering material according to the reference example contains the (A) component to the (C) component, but does not contain the (D) component, so that the resin composition is slightly inferior in high-temperature oil resistance, insulation elongation, and wear resistance in comparison with the composition according to the present invention.

Meanwhile, the resin compositions for a wire covering materials according to the present Examples contain the (A) polysulfone-based resin, the (B) aromatic polyester resin, the (C) polyester elastomer, and the (D) compound having a reactive functional group that reacts with a carboxyl group or a hydroxyl group, so that the resin composition is excellent in high-temperature oil resistance, wear resistance, and elongation at a high level. The insulated wires made from these resin compositions can be used in a vibration environment in oil at high temperature. In addition, being excellent in wear resistance, the resin compositions can contribute to reduction of the diameters of electric wires by thinning their insulation coverings, and to space-saving of the wiring harnesses.

By comparing the resin compositions according to Examples 1, 2, and 3, it is found that when polyether sulfone or polyphenyl sulfone is used as the (A) polysulfone-based resin, the resin compositions are more excellent in wear resistance. Further, when the polyphenyl sulfone is used as the (A) polysulfone-based resin, the resin compositions are more excellent in high-temperature oil resistance. By comparing the resin compositions according to Examples 1, 4, and 5, it is found that when the (B) aromatic polyester resins have a naphthyl group in their repeating unit structures, the resin compositions are more excellent in high-temperature oil resistance, and more excellent also in wear resistance and elongation. It is presumed that because the (B) aromatic polyester resins have a naphthyl group, the compatibility between the (A) polysulfone-based resins and the (C) polyester elastomers are improved. By comparing the resin compositions according to Examples 1, 6, 7, and 8, it is found that when the (C) polyester elastomers have a melting point of 200° C. or higher, the resin compositions are more excellent in high-temperature oil resistance.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. A resin composition for a wire covering material, the composition comprising:
   a (A) polysulfone-based resin;
   a (B) aromatic polyester resin;
   a (C) polyester elastomer; and
   a (D) compound having a reactive functional group that reacts with one of a carboxyl group and a hydroxyl group,
   wherein the (D) component reacts with one of the (B) component and the (C) component to form a bond, and
   wherein 1 to 40 mass % of the (B) aromatic polyester resin is contained with respect to the total mass of the (A) component and the (B) component.

2. The resin composition for a wire covering material according to claim 1, wherein 1 to 50 mass % of the (C) polyester elastomer is contained with respect to the total mass of the (A) component and the (C) component.

3. The resin composition for a wire covering material according to claim 1, wherein 0.01 to 5 parts by mass of the (D) compound having a reactive functional group that reacts with one of a carboxyl group and a hydroxyl group is contained with respect to 100 parts by mass of the total of the (A) component to the (C) component.

4. The resin composition for a wire covering material according to claim 1, wherein the (A) polysulfone-based resin comprises one or two or more kinds of polysulfone-based resins selected from the group consisting of polyether sulfone and polyphenyl sulfone.

5. The resin composition for a wire covering material according to claim 1, wherein the (B) aromatic polyester resin has a naphthyl group in a repeating unit structure.

6. The resin composition for a wire covering material according to claim 1, wherein the (C) polyester elastomer has a melting point of 200° C. or higher.

7. An insulated wire comprising a wire covering that comprises the resin composition for a wire covering material according claim 1.

8. A wiring harness comprising the insulated wire according to claim claim 7.

9. The resin composition for a wire covering material according to claim 1, wherein the combined amount of (A), (B), (C), and (D) is equal to 100% of the total amount of materials present in the resin composition.

10. The resin composition for a wire covering material according to claim 1, wherein:
   (A) is present from 30 to 98 parts by weight per 100 parts by weight of the combined amount of (A), (B) and (C);
   (B) is present from 0.5 to 40 parts by weight per 100 parts by weight of the combined amount of (A), (B) and (C);
   (C) is present from 0.5 to 60 parts by weight per 100 parts by weight of the combined amount of (A), (B) and (C); and
   (D) is present from 0.001 to 3 parts by weight per 100 parts by weight of the combined amount of (A), (B) and (C).

11. The resin composition for a wire covering material according to claim 1, wherein the reactive functional group in the (D) component is a carbodiimide group or an oxazoline group.

* * * * *